(12) United States Patent
Allen et al.

(10) Patent No.: US 7,497,370 B2
(45) Date of Patent: Mar. 3, 2009

(54) SUPPLY CHAIN VISIBILITY SOLUTION ARCHITECTURE

(75) Inventors: Lingzhi L. Allen, Bothell, WA (US); Craig A. Schwandt, Bellevue, WA (US); Mohammad A. Adil, Carrollton, TX (US); Frank J. Beeson, Kenmore, WA (US); Andy P. Salvador, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 520 days.

(21) Appl. No.: 11/094,052

(22) Filed: Mar. 29, 2005

(65) Prior Publication Data
US 2006/0163338 A1 Jul. 27, 2006

Related U.S. Application Data

(60) Provisional application No. 60/647,644, filed on Jan. 27, 2005.

(51) Int. Cl.
*G06F 17/00* (2006.01)
(52) U.S. Cl. .................................................. 235/375
(58) Field of Classification Search ............... 235/375, 235/492; 340/572.1; 707/4, 100
See application file for complete search history.

(56) References Cited

U.S. PATENT DOCUMENTS

| | | | | |
|---|---|---|---|---|
| 5,963,134 | A * | 10/1999 | Bowers et al. | 340/572.1 |
| 6,823,022 | B1 * | 11/2004 | Fullerton et al. | 375/285 |
| 2002/0095307 | A1 * | 7/2002 | Greamo et al. | 705/1 |
| 2003/0083126 | A1 * | 5/2003 | Paulsen | 463/25 |
| 2003/0208460 | A1 * | 11/2003 | Srikant et al. | 707/1 |
| 2004/0111410 | A1 * | 6/2004 | Burgoon et al. | 707/4 |
| 2004/0193641 | A1 * | 9/2004 | Lin | 707/104.1 |
| 2005/0103835 | A1 * | 5/2005 | Kunito et al. | 235/375 |
| 2006/0149776 | A1 * | 7/2006 | Lin | 707/102 |

* cited by examiner

*Primary Examiner*—Kumiko C Koyama
(74) *Attorney, Agent, or Firm*—Vierra Magen Marcus & DeNiro LLP

(57) ABSTRACT

A supply chain (or other process) visibility solution combines RFID technology with a data visibility architecture to provide real-time or near real-time supply chain information at various stages of the supply chain (or other process). The system uses a data gathering architecture which collects data from multiple sources about an object. The sources of data include RFID tags, scanners and manual input. The data from the RFID tags is used to correlate the gathered data to attributes associated with the object (e.g., name, description or price). The gathered data and attributes are stored in a data store according to a customizable schema and published for consumption by one or more business processes.

7 Claims, 9 Drawing Sheets

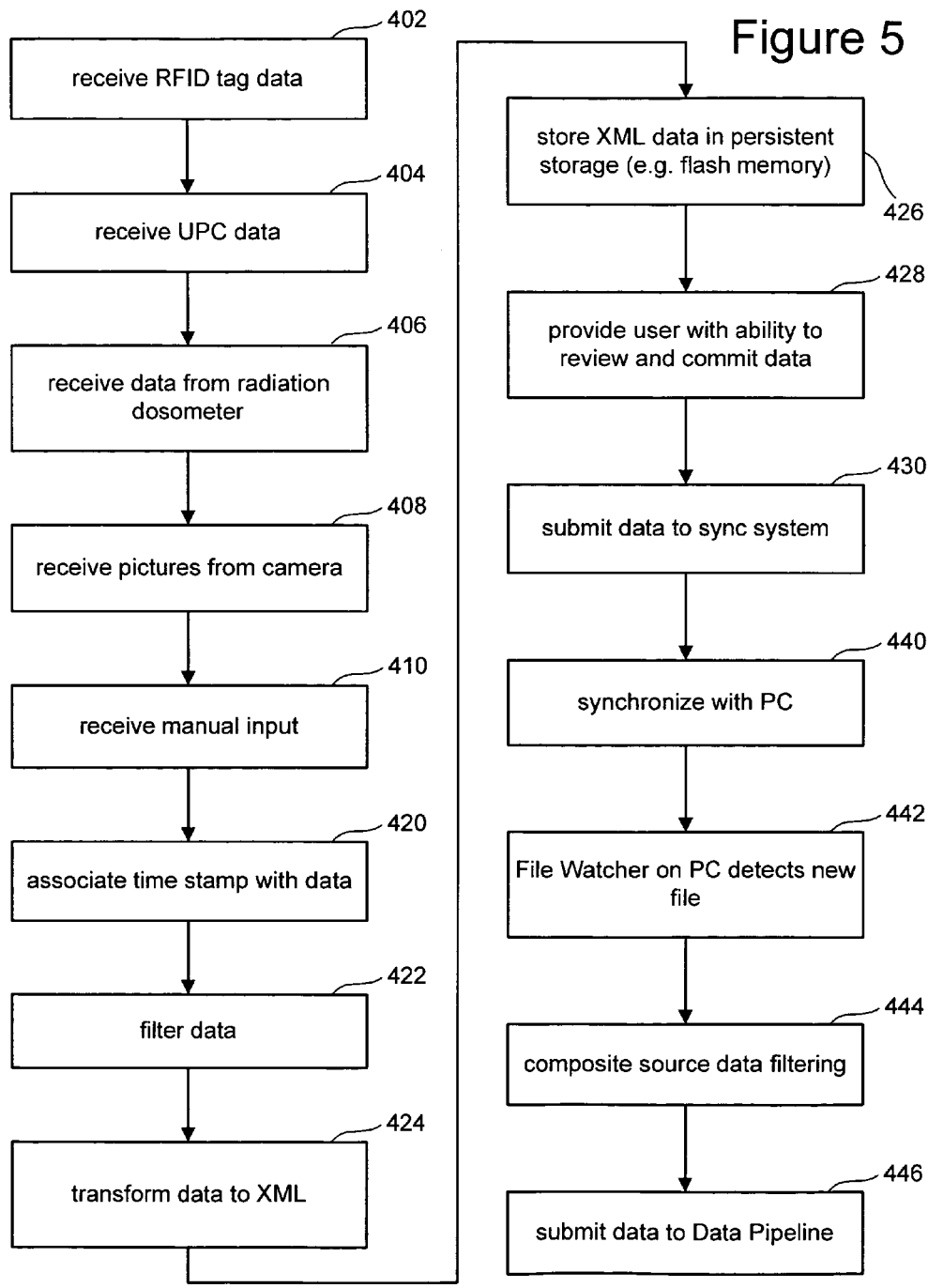

SUPPLY CHAIN VISIBILITY SOLUTION ARCHITECTURE

This application claims the benefit of U.S. Provisional Application No. 60/647,644, "Supply Chain Visibility Architecture," filed on Jan. 27, 2005, incorporated herein by reference in its entirety.

BACKGROUND OF THE INVENTION

1. Field of the Invention

The present invention relates to technology for gathering and processing data associated with a supply chain or other process.

2. Description of the Related Art

Radio frequency identification ("RFID") is one of the most rapidly growing segments of today's automatic identification data collection industry. Applications that make use of RFID's features and capabilities are demonstrating significant improvements with respect to gathering data. In many cases, RFID is a complement to bar code technology. For example, in many situations when tracking pallets, cartons, or cases in a warehouse, both technologies are used.

RFID technology overcomes certain limitations found in some bar code applications. Because it is not an optical technology like bar coding, no inherent line of sight is required between the reader and the tagged RFID object. In addition, RFID is a "read-write" technology, so it can update or change the data encoded in the tag during the tracking cycle. Another important difference with respect to bar codes is that dozens of RFID tags can be read effectively by the same reader simultaneously. This feature, coupled with RFID's ability to read and write through packaging material, creates interesting opportunities for unattended identification of the entire contents of pallets, transit containers, and other items. Thus, RFID technology has become useful for tracking the movement of goods through the supply chain.

The movement of goods through the supply chain can begin on the factory or warehouse floor. Warehouse management systems already track steps in the process as they are completed. The next improvement is tracking inventory between the steps within the facility and after leaving the facility, which in turn means monitoring the movement of inventory at the level of the conveyors, sorters, and palletizers. It's no longer enough to have control systems and software in place to direct the automated materials handling equipment that move inventory through a facility and through a supply chain. Just as important will be the ability to manage in real-time all information about the status of each item at all times, including after leaving the factory and warehouse floor.

SUMMARY OF THE INVENTION

A supply chain visibility solution is disclosed that combines RFID technology with a data visibility architecture to provide real-time or near real-time supply chain information at various stages of the supply chain. The system uses a data gathering architecture which collects data from multiple sources about an object. The sources of data include RFID tags, scanners and manual input. The data from the RFID tags is used to correlate the gathered data to attributes associated with the object (e.g., name, description or price). The gathered data and attributes are stored in a data store according to a customizable schema and published for consumption by one or more business processes.

One example of how business processes use the data includes using a application integration server that is designed to support complex, distributed business processes. One embodiment of such a server includes a messaging engine that provides an integration framework together with the ability to depict a business process in flow chart manner and link executable components. In this way, multiple different business applications can communicate with the gathered data to perform various business processes. Another example of how business processes use the data includes using an extraction, transformation and loading process to provide the gathered data to a data warehouse for use by data mining tools.

One embodiment of the present invention includes receiving status information about one or more objects, where the status information includes RFID data and status data about the one or more objects. That status data is stored in a first format. The status data is mapped to attribute information about the one or more objects using the RFID data. The status data and attribute information is transformed to a first schema based on metadata and provided to different applications via an application integration entity. In addition to being used for monitoring data in the supply chain, the technology described herein can be used to monitor objects within other processes.

BRIEF DESCRIPTION OF THE DRAWINGS

FIG. 5 is a flow chart describing one embodiment of a process for gathering data.

DETAILED DESCRIPTION

Figure 1:
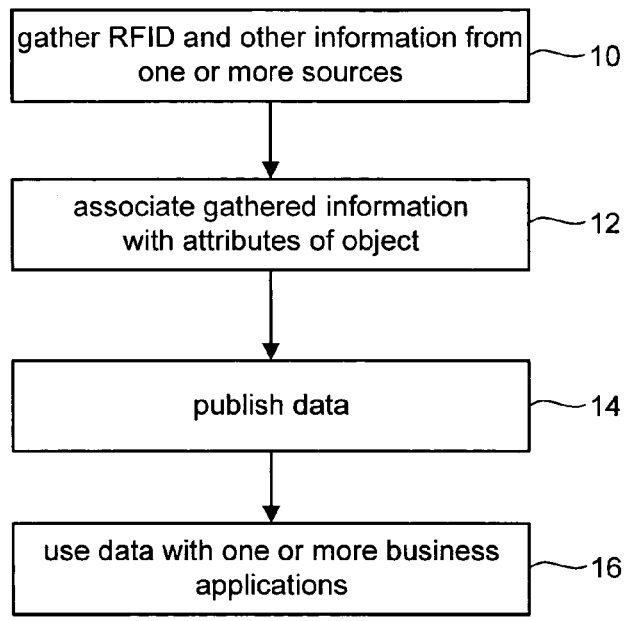
FIG. 1 is a flow chart describing one embodiment of a process for providing data visibility using RFID technology.

FIG. 1 is a flow chart describing one embodiment of a process for providing data visibility using RFID technology. The system uses a data gathering architecture which collects RFID data and other data about an object from multiple sources (step 10). Using the RFID tags, the gathered data is associated with attributes of the object such as name, description or price (step 12). The gathered data and attributes are published for consumption by various applications (step 16). The published data is used by one or more business applications (step 18)

One example of a use for the disclosed system is to track goods in a warehouse. For example, data acquisition can begin at the point at which goods arrive at the inventory stocking points. RFID tag readers, which read the EPC codes on the RFID tags, can be located at the entry point. The goods then proceed to inventory shelves, which are also equipped with RFID tag readers. When orders from customers are processed, and packages are ready to be shipped, they are passed to the loading dock through another set of RFID tag readers which again note the EPC codes of the goods being shipped. A software application managing data acquisition for the distributor warehouse communicates with the RFID tag readers installed at the various locations in the warehouse. The software application receives large amounts of data from many the many RFID tag readers. This data is converted into real-time product status information. The product status information, stored either in a centralized database or distributed databases, is then made available to business process tools or analytical tools.

Figure 2:
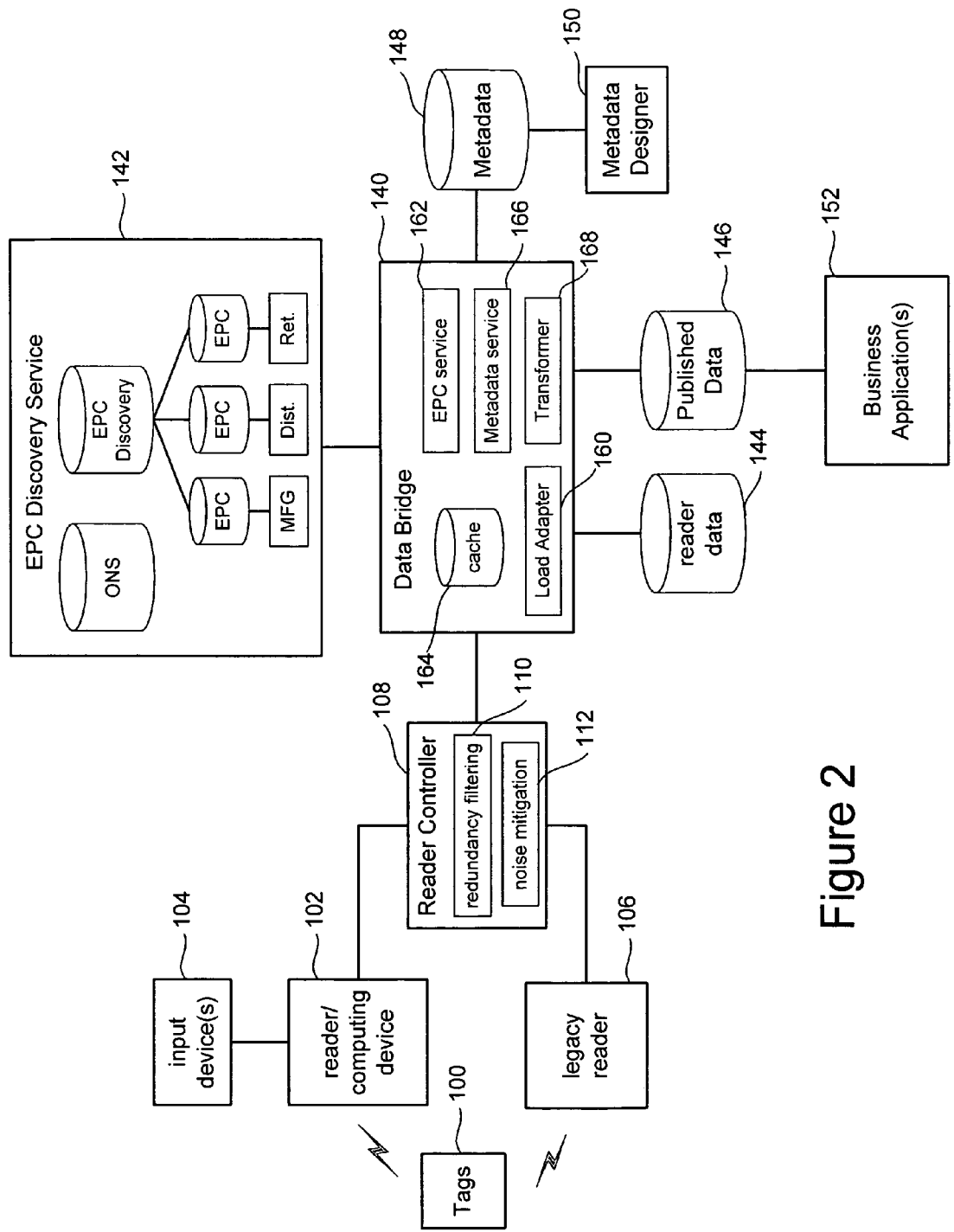
FIG. 2 is a block diagram depicting one embodiment of an architecture for providing data visibility using RFID technology.

FIG. 2 depicts one example of an architecture that can implement the process of FIG. 1. The components of FIG. 2 can be grouped into a data gathering system, a data connectivity and transformation system, and business application(s). For example, RFID tags 100, reader/computing device 102, input device(s) 104, legacy reader 106 and Reader Controller 108 comprise the data gathering system. Data Bridge 140, EPC Discovery Service 142, Reader Data 144, Published Data 146, Metadata 148 and Metadata Designer 150 comprise the data connectivity and transformation system. Business Application(s) 152 is depicted to be in communication with Published Data 146. Each of these elements can communicate using Ethernet or other known network technologies.

First, the data gathering system will be explained. The data collection application is the starting point for the business process that the RFID tags are supporting. In one embodiment, it should be flexible because the business process may require a variety of input types in addition to RFID tags, such as manual input and perhaps bar codes. It needs to be kept simple, so that the user has little opportunity for error. The data gathering system should also be robust so that it can support disconnected scenarios as well as connected scenarios, power failures, and the design points for the RFID tag reader hardware interfaces, active or passive, using tag inventory, or tag search modalities.

FIG. 2 shows RFID tags 100, which can represent one or more RFID tags attached to or co-located with one or more objects (e.g., products). RFID tags typically (but not always) consist of an integrated circuit ("IC") attached to an antenna—typically printed or etched conductors on a thin plastic sheet. Data is stored on the IC and transmitted through the antenna. RFID tags are either passive (no battery) or active (self-powered by a battery). Data transmission speed and range depend on the frequency used, antenna size, power output, and interference. Tags can be read-only, read-write, or a combination, in which some data (such as a serial number) is permanently stored, while other memory is left available for later encoding or to be updated during usage.

Information is sent to and read from RFID tags using RF signals. In passive systems, which are the most common, an RFID reader transmits an energy field that "wakes up" the tag and provides power to the chip, enabling it to transmit or store data. In active systems, batteries typically are used to boost the effective operational range of the tag. Active tags may also periodically transmit a signal, much like a lighthouse beacon, so that data may be captured by readers distributed throughout a facility. Encryption algorithms that ensure security and integrity of the data passing between the tag and reader may protect transmissions.

Readers may be integrated into handheld terminals, or they may be fixed and positioned at strategic points, such as a facility entrance, dock door, or on an assembly line. Readers include antennas (one or more) for sending and receiving signals to and from tags and a processor for decoding received signals and data. Collected data is then passed through normal interfaces (cabled or by wireless local area network) to host computer systems.

RFID tags can be read through packaging, shipping containers, and most materials except metal. Beer kegs, gas cylinders, and other metal objects are commonly identified with special RFID tags that are modified and positioned to minimize interference.

"Smart labels" refer to labels with embedded ultra-thin RFID tags, which are often called "inlays." Inlays for smart labels are available in the 13.56 MHz, 860 to 930 MHz, and 2.45 GHz frequency ranges. Smart labels are called "smart" because of the flexible capabilities provided by the RFID tag embedded in the label. The tag, in most cases, can be programmed and/or updated in the field, so that the same label can be reused to serve multiple needs and disparate applications. Hence, the label in no longer effectively static as is a bar code label, but rather is dynamic in its capability when equipped with RFID.

Passive smart label RFID systems overcome the limitations of many existing bar code-based automatic data capture systems in that they provide error-free, wireless data transmission that is battery-free and maintenance-free; do not require line-of-sight scanners for operation; allow stored data to be altered during sorting or to capture workflow process information; and work effectively even in harsh environments with excessive dirt, dust, moisture, and temperature extremes.

In one embodiment, the RFID tags will store and transmit Electronic Product Codes ("EPC"). The EPC code was conceived as a means to identify physical objects and was intended to be a short, simple and extensible code designed primarily to reference networked information. This number is analogous to the IP address given to computer nodes on the Internet. It is also somewhat similar to the UPC/EAN (universal product code/international article number) system, although where UPC/EAN identifies types of object, the EPC uniquely identifies each individual object.

Figure 3A:
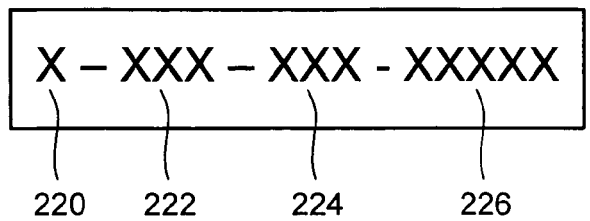
FIGS. 3A-D depict formats for Electronic Product Codes ("EPC").

There are various formats for implementing an EPC code. FIGS. 3A-D depict four example formats. FIG. 3A depicts a 96-bit schema with an 8-bit header 220 and three data partitions (222, 224, and 226). Each 'X' in FIG. 3A indicates 8 bits. A 96-bit number was chosen as a compromise between the desire to ensure that all objects have a unique EPC and the current limitations of proposed tag technology described herein. The partitions of the EPC enable a hierarchical search for the information about the object tagged with a particular EPC.

EPC header 220 is used to indicate the format, or total length and field partitions, of the EPC. The header provides for the flexibility in the system. It permits multiple EPC formats thereby allowing the seamless use of longer bit-length tags as the technology matures. The header also permits the bits of a particular length to be distributed.

The next two data partitions are manufacturer partition 222 (28 bits) and product code partition 224 (24 bits). The final data partition 226 represents the product serial number, allowing each tagged item to be uniquely identified. A 36-bit serial number allows over 68 billion uniquely identified objects for each of the 16 million products.

Figure 3B:
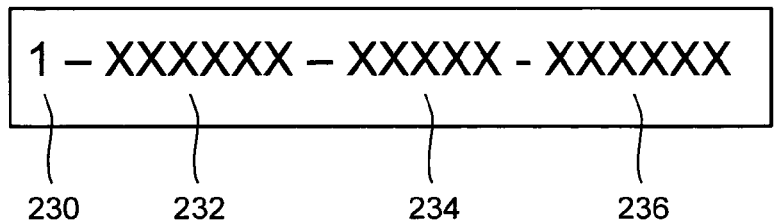
Figure 3C:
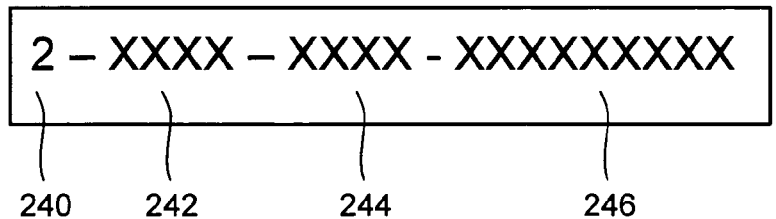

The incremental cost of encoding additional bits on electronic tags promoted the investigation of a reduced size or "compact," EPC code. Since the EPC identifies 'all physical objects, it should be sufficiently large to enumerate at least those objects of interest for purposes of tracking and identification. Although 96-bits is small and fits easily into many commercial RFID tags, there is a desire to reduce this number still further to continue to cut the cost of the electronic identifier. The 64-bit Electronic Product Code (EPC-64), three variations of which are depicted in FIGS. 3B-C, is a proper subset of the 96-bit version. A first assumption is that the 64-bit version of the EPC code will be transitional, that is it will be used for a time before the widespread use of a 96-bit or longer identifier. A second assumption is that the 64-bit version will be used predominately by larger manufactures, and those with more cost sensitive consumer products. There should be at least one type of the EPC-64 that can accommodate a large number of items. A third assumption is that the application of the EPC code will extend beyond traditional consumer products. Variations of the 64-bit EPC codes are defined to allow a significantly greater range of companies and organizations. Most of these users will have far fewer products and items than larger consumer product companies. Furthermore, the EPC codes are fully compatible with each other, so that a 64-bit, 96-bit or 256-bit version will be transparent to the system.

Figure 3D:
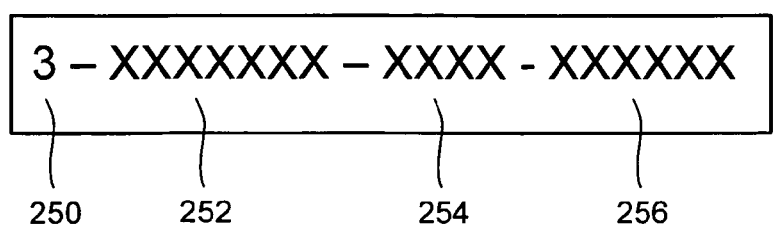

FIG. 3B depicts the first variation of the 64-bit EPC code. The code includes a two bit header 230 with data value of 1, a twenty one bit manager partition 232, seventeen bit object class partition 234 and a twenty four bit serial number 236. FIG. 3C depicts the second variation of the 64-bit EPC code. The code includes a two bit header 240 with data value of 2, fifteen bit manager partition 242, a thirteen bit object class partition 244 and a thirty four bit serial number 246. FIG. 3D depicts the third variation of the 64-bit EPC code. The code includes a two bit header 250 with data value of 3, a twenty six bit manager partition 252, a thirteen bit object class partition 254 and a twenty three bit serial number 256.

The EPC-96 and EPC-64 were designed for the short term use of the Electronic Product Code as a physical object identifier. The EPC-96 and EPC-64 versions were developed with the knowledge that the limitations imposed by these representations may make them insufficient for the long term use of the EPC code as a universal identification scheme. Larger EPC representations have always been expected and planned for with the use of a Version Number in the EPC representation. For example, a 256-bit EPC code may be used. In one example, the 256-bit EPC code may include a thirty two bit manager partition, fifty six bit object class and one hundred and ninety two bit serial number. In another example, the 256-bit EPC code may include a sixty four bit manager partition, fifty six bit object class and one hundred and twenty eight bit serial number. In another example, the 256-bit EPC code may include a one hundred and twenty eight bit manager partition, fifty six bit object class and sixty four bit serial number.

Looking back at FIG. 2, the RFID tags 100 are read by reader/computing device 102 and/or legacy reader 106. In one embodiment, legacy reader 106 is the traditional RFID reader known in the art and the reader/computing device 102 is a Windows CE .NET based RFID reader that allows use of Visual Studio .NET and NET Compact framework. Reader/computing device 102 includes a RFID reader and a computing device. In one embodiment, reader/computing device 102 is in communication with other input devices 102, which can include manual input devices, bar code scanners and radiation dosometers. Additionally, reader/computing device 102 can directly receive manual inputted data, as explained below. In one embodiment, legacy reader 106 and reader/computing device 102 can be connected to a multiplexer in order to share an antenna.

FIG. 2 depicts legacy reader 106 and reader/computing device 102 communicating data to Reader Controller 108, which has a redundancy filter 110 and a noise mitigation process 112. Redundancy filer 110 removes redundant data (e.g. from multiple RFID readers) and noise mitigation process 112 reduces noise in the data.

Figure 4:
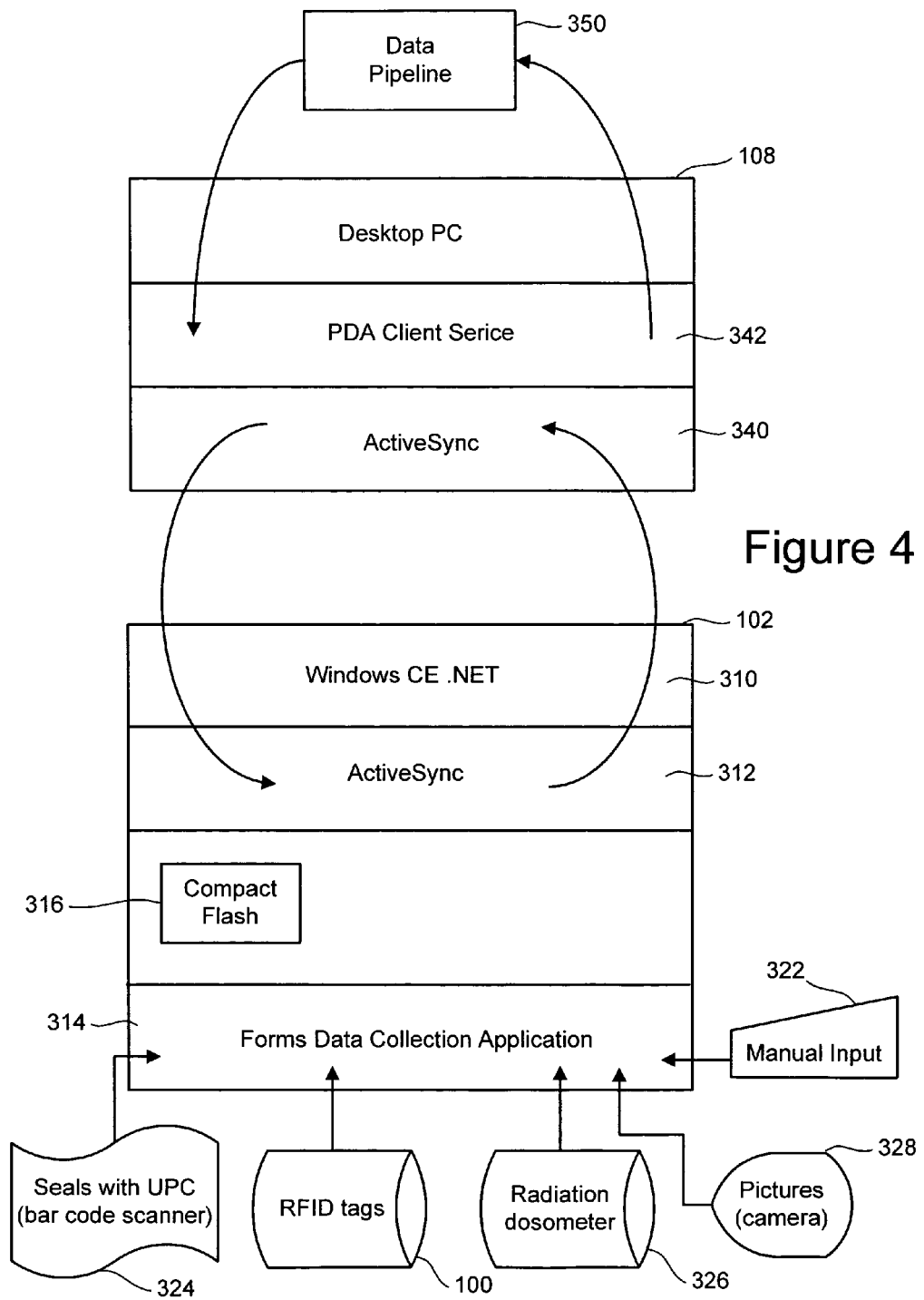
FIG. 4 is a block diagram of one embodiment of a data collection system.

FIG. 4 depicts more details of one example of a reader/computing device 102 and Reader Controller 108. Reader/computing device 102 utilizes Windows CE .NET 310 with ActiveSync services 312. To perform the data gathering, a forms based collection application 314 is used. Compact flash 316 (or other non-volatile memory) is used to store data from application 314. Application 314 can receive data from RFID tags 100, manual input 322, bas code scanner 324 (UPC seals), radiation dosometer 326 and camera 328 (pictures). In one embodiment, application 314 is a forms based application. Each screen depicts a form. The forms includes fields to input data. The user can manually input data into some of the fields (e.g., input text, choose from a menu). Other fields are filled in using data received from the RFID reader, bar code scanner, radiation dosometer or camera. Data in some of the fields ca be pre-populated, as explained below.

Data gathered will be provided to ActiveSync service 312, which synchronizes the data with ActiveSync service 340 of Reader Controller 108. In one embodiment, Reader Controller 108 is a personal computer connected to a cradle. Device 102 is placed in the cradle and synchronized with Reader Controller 108. In other embodiments, the synchronization can be performed wirelessly or via another means. The data synchronized to Reader Controller 108 is provided to PDA Client service 342 which can perform the filtering and noise mitigation, as well as forwarding the date to data pipeline 350. In one embodiment, data pipeline 350 represents the data connectivity and transformation system.

FIG. 5 is a flow chart describing one embodiment of a process for operating the system depicted in FIG. 4. In step 402, RFID tag data is received by application 314 from one or more RFID tags via an RFID reader. In step 404, UPC data is received by application 314 from bar code scanner 324. In step 406, application 314 receives data from Radiation Dosometer 326. In step 408, application 314 receives image data from camera 328. In step 410, manual input (e.g., user providing data in forms of GUI) is received by application 314. In step 420, application 314 associates a time stamp with the data. Note that steps 401-410 (acquiring status data about an object in the supply chain) can be performed in any order and simultaneously. In step 422, the data is filtered. For example, if redundant data was received, only one copy need be retained.

In step 424, the data is mapped to elements in an XML file after passing through an XSL transform to make the output data conform to a given schema. In one embodiment, the XSL transform can include the filtering of step 422. In step 426 the XML data is stored in persistent memory. This provides resiliency, allows for normal power-off by the user, and provides a robust solution for possible battery power failures. An example of persistent memory is flash memory (e.g., Compact Flash 316 or Secure Digital). In one embodiment, application 314 includes an interface that comprises a set of screens, with each screen being a form with various fields. After a user completes a form/screen, the data for that form/screen is mapped to an XML format and stored on Compact Flash 316.

In step 428, the user is given with the opportunity to review all of the data that was provided to application 314. If the data is as intended, the data is committed by the user and provided to ActiveSync 312 in step 430. In step 440, the data is synchronized with ActiveSync 340 on the desktop PC. This synchronization can be direct and synchronous, such as via a wireless connection, or the file can be retained and submitted later when the Windows CE device is connected to a PC or directly to a network. In the later case, while a custom protocol could be used, the built-in facilities of ActiveSync will move the submitted files to a partnered PC automatically, and conversely will delete obsolete files when their synchronized counterparts are deleted from the PC. PDA Client Service 342 on the partnered PC implements a file watcher on the ActiveSync synchronized files directory that detects the new files and prepares them for submission them into the data pipeline in step 442. This same service can do composite source data filtering (i.e. redacting redundant information from multiple readers, apply schemas to ensure data conformance, other kinds of noise reduction) in step 444. The data is then provided to data pipeline 350 in step 446.

Figure 6:
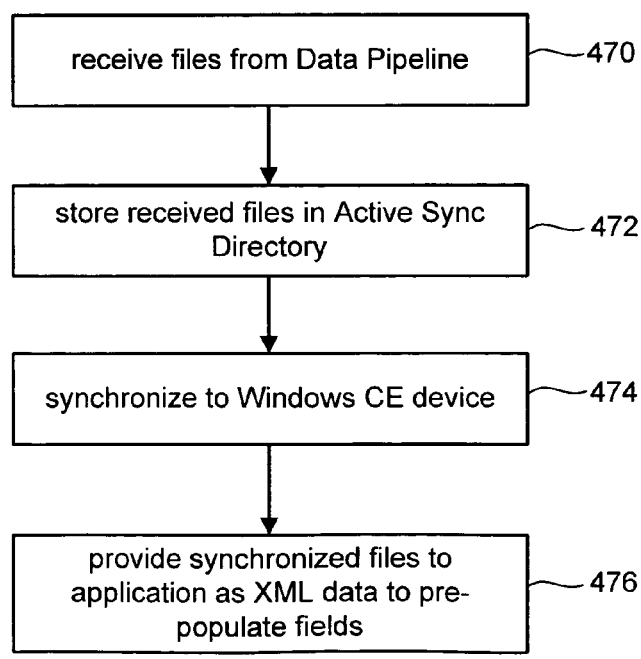
FIG. 6 is a flow chart describing one embodiment of a process for providing feedback to a data gathering system.

The data gathering system also allows for two-way communication. If needed, files can be downloaded from Data Bridge 140. FIG. 6 depicts a flow chart describing the process for providing feedback data from the data connectivity and transformation system to the data gathering system. Files are received from Data Pipeline 350 in step 470, or from some other service. The received files are placed in the ActiveSync 340 synchronized files directory in step 472. During a synchronization process, the files will then automatically move to Active Sync 312 synchronized files directory in step 474. The synchronized files are provided to application 314 as XML data to pre-populate the fields of the forms/screens of application 314.

Looking back at FIG. 2, the data connectivity and transformation system comprises Data Bridge 140, EPC Discovery Service 142, Reader Data 144, Published Data 146, Metadata 148 and Metadata Designer 150. Data Bridge 140 is in communication with Reader Controller 108, EPC Discovery Service 142, Reader Data 144, Published Data 146, and Metadata 148. Data Bridge 140 includes Load Adapter Service 160, EPC Service 162, cache 164, Metadata service 166 and Transformer Service 168. Load Adapter Service 160 receives the data from Reader Controller 108 and stores that data in Reader Data 144, which can be an SQL Server staging database. Based on the RFID tag received in that data, EPC Service 162 maps RFID tag to product/object attributes associated with the RFID tag. Transformer 168 will then transform the data (data from data gathering system and product/object attributes) to comply with a schema/format based on metadata received/managed by Metadata service 166. The transformed data is stored in Published Data store 146.

Figure 7:
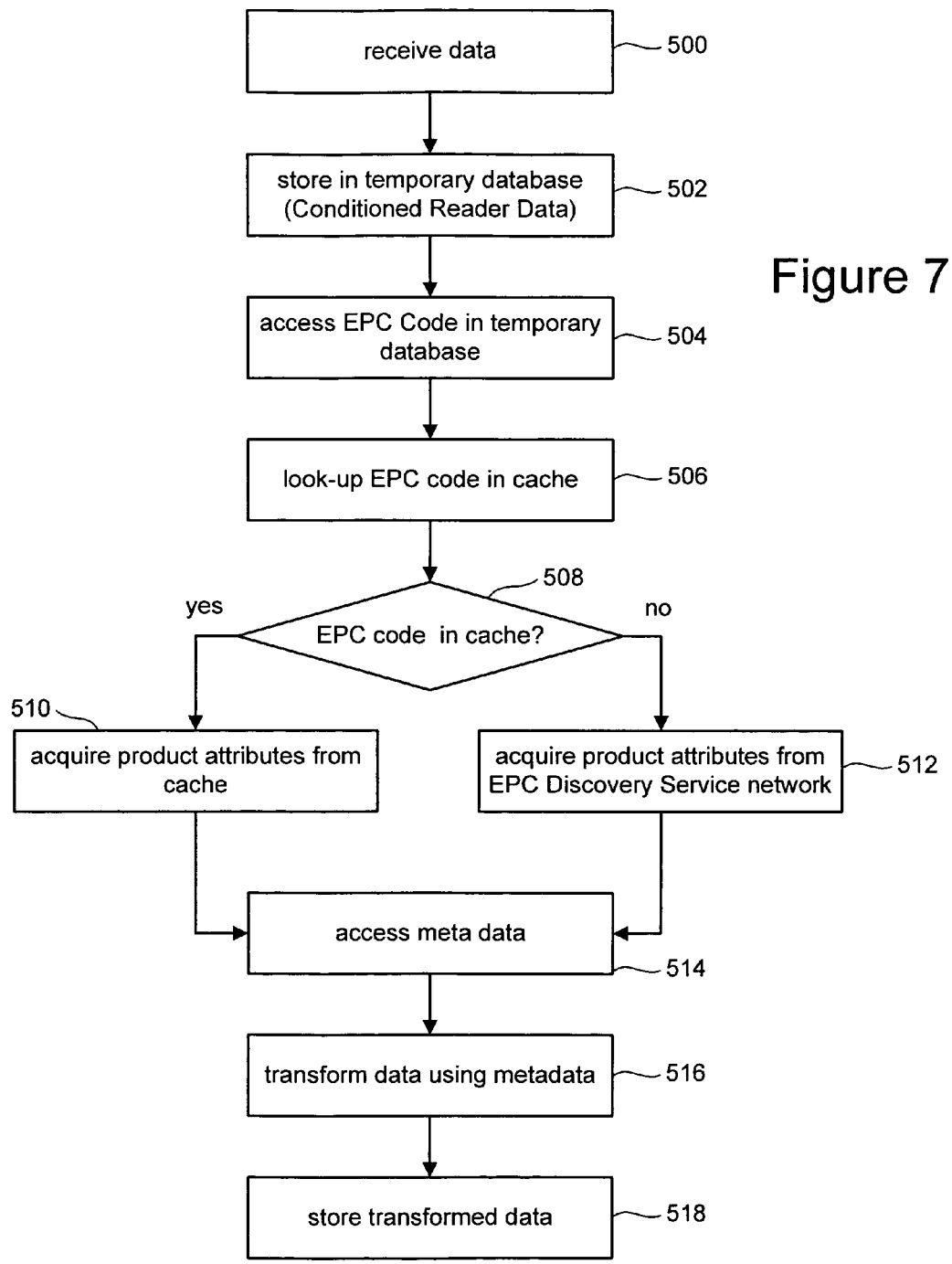
FIG. 7 is a flow chart describing one embodiment of a process for loading, mapping and transforming data.

FIG. 7 is a flow chart describing the operation of Data Bridge 140. In step 500, Load Adapter 160 receives data from Reader Controller 108. In step 502, the received data is loaded into Reader Data store 144. The data loading should be near-real time. The data can be loaded as a flat file or directly into an SQL Server staging database. In the case of flat files, the system can use either bulk copy or a DTS flat file loading task to load the data into the staging database.

Figure 8:
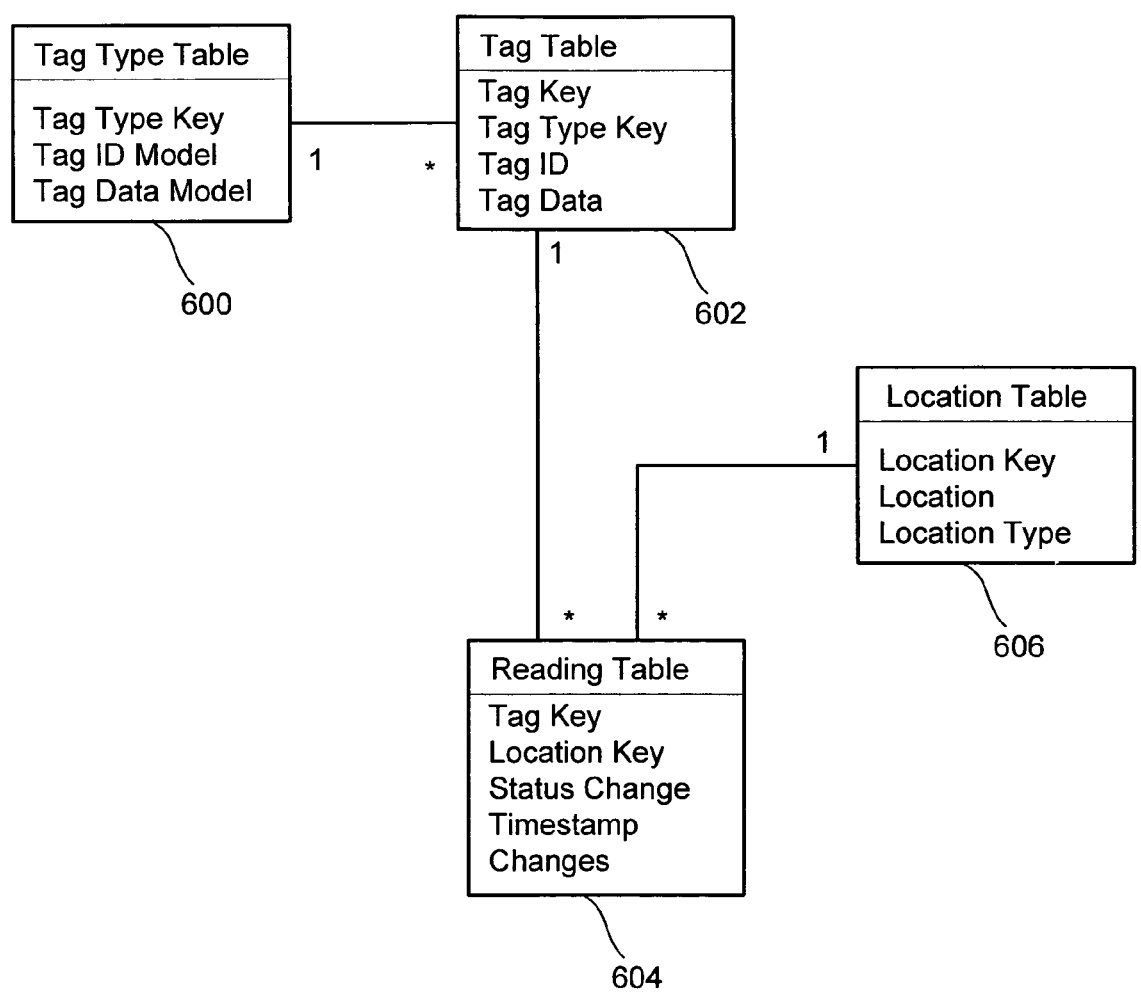
FIG. 8 depicts an example of a schema.

If Reader Data 144 is implemented using an SQL Server, the schema of the staging database should accommodate the EPC code, and associated reader properties like time stamp, status and reader location id. The schema needs to be flexible enough to accommodate EPC-64, EPC-96 and EPC-256 codes. FIG. 8 depicts one example of a suitable schema. Tag type table 600 stores a Tag Type Key, Tag ID Model, and Tag Data Model. Tag Table 602 stores a Tag Key, Tag Type Key, Tag ID and Tag Data. Reading Table 604 stores a Tag Key, Location Key, Status Change, Timestamp and Changes. Location Table 606 stores a Location Key, Location, and Location Type. Other variations of the schema can be used. The disclosed architecture is not limited to any particular schema. In one embodiment, Tag Type Table 600, Tag Table 602 and Location Table 606 can be populated during deployment because the data can be comparatively stable; however, they can be changed any time. The data gathering system will send data for "Reading Table" 604 with each scan, sometimes at a high frequency.

Looking back at step 504 of FIG. 7, EPC Service 162 accesses the EPC tag for the newly received data. In step 506, EPC Service 162 determines whether the EPC code is in cache 164. If the EPC code is in cache 164 (step 508), then the product attributes stored in the cache for the EPC code are read from the cache by EPC Service 162. If the EPC code is not cache 164 (step 508), then EPC Service 162 acquires the product attributes from EPC Discovery Service 142 in step 510.

EPC Discovery Service 142 is a service that will return attributes for with an object associated with a particular EPC code in response to an inquiry regarding the particular EPC code. There are multiple suitable architectures for EPC Discovery Service known in the art that can be used with the technology disclosed herein. The service depicted in FIG. 2 includes an Object Naming Service (ONS), an EPC Discovery data store, and EPC data stores (EPC) associated with manufacturing (MFG), distribution (Dist.) and retail (Ret.).

In step 514 of FIG. 7 (after steps 510 or 512), metadata from Metadata service 166 is accessed. In step 516, Transformer service 168 transforms the data from the data gathering system and the product attributes to conform to a schema for Published Data 146. The transformation is based on the metadata from step 514. In step 518, the transformed data is stored in Published Data 146, where it is published for consumption by various applications 152.

In addition to common product attributes, data for each object could contain extensive product and operational information. Examples of such data include: Product Data (e.g., parameter, history and transaction details); Operation Data (e.g., bill of materials, recipes and routing); and Product State (e.g., location and temperature). Issues related to content, format and frequency vary based on implementation. The attributes and data vary by product type and application scenario. The ideal choice of a flexible and extensible solution is to use a custom metadata driven data processing system. For example, FIG. 2 shows a Metadata Designer 150 that can be used to create metadata 148 which is customized for a specific implementation. One example of a suitable Metadata Designer system is DTS Designer from Microsoft Corporation.

In one embodiment, the metadata driven data processing system components are generated programmatically. This allows the developer to quickly generate and test multiple iterations of the prototype. The DTS packages should be dynamically generated from code using schema information that developers provide. Because each environment in which the application runs is unique, the requirements for each environment cannot be completely anticipated. After completing the final iteration of the application, developers must be able to configure, extend, and customize the metadata data processing system before it is deployed. Developers can use DTS Designer to view and understand the metadata data processing system. Developers can then extend and customize the data processing system by modifying the packages that are generated automatically by the Data Bridge or by adding new packages. Generated packages can generally be modified directly in DTS Designer. New packages can be generated directly in DTS Designer or in Microsoft Visual Basic.

In one embodiment, Database Administrators (DBAs) should be able to understand, configure, and manage the metadata driven data processing system easily using standard SQL Server tools. While the components of the data processing system are generated programmatically and can be extended by developers, DBAs should be able to manage the day-to-day operations of the data processing system using tools with which they are familiar. DBAs can also use DTS Designer to view and understand the data processing system. DBAs can configure and manage the data processing system using global variable configurations, batch files, a Config.ini file, error tables and log files, all of which can be managed with standard tools.

DTS Designer packages can establish valid connection data stores. To accomplish this, connection objects within each packages store connection information for the data stores the package uses. Tasks within the package use these connection objects when connecting to the data stores. Because the connection information for these data stores is embedded within connection objects, each connection object can be updated with new connection information when the data store changes.

The use of application metadata within the data processing system poses a similar problem. When application metadata within the data processing system (e.g., path to the application files) changes, each task relying on the original file path should be uploaded. For example, when a data processing system is moved from the development environment to a QA environment, the source and destination data stores for all packages in the system may need to be updated. Application metadata may also require updating when the data processing system is moved. For a system with many packages, updating each package individually is a daunting and potentially error-prone task.

Fortunately, DTS Designer provides several methods that enable connection information for a package to be retrieved at run time from a source outside of the package. These methods use the Data Link connection object or the Dynamic Properties task.

By using a Data Link connection object in a package, the package connection properties can be configured from a Microsoft Data Link (*.udl) file at run time. If connection information used by multiple packages is placed in a single file stored in the file system, then the connection information can be changed for multiple packages at the same time, without editing each package individually. The next time that a package runs that references the data link file, the package uses the updated connection information. A data link file, however, can only store connection information for a single data store.

By using a Dynamic Properties task, one can enable one or more values to be retrieved at run time from an external data store and then assigned to selected object properties within a package (such as connection object properties). An initialization (*.ini) file is one of the data stores from which values can be retrieved. An *.ini file is a text file in which connection information and other information that package objects require can be stored. An *.ini file can stored multiple types of information, including connection information for multiple data stores and initialization values for multiple global variables. A designer can choose to use either of the above mentioned mechanisms to set the connection properties for source and destination connection objects dynamically.

Packages can use global variables to hold values. These values are assigned to package properties and are used in package tasks to modify functionality. For example, global variables can be used to determine whether a given package executes; the batch size of a data import processes; the maximum number of errors that are permitted; and the algorithm that is used to determine if data contains inserts, updates, or both. Global variables and their values can either be passed by a parent package to its child packages, or a child package can use global variable values that are different from those of its parent package.

The default value for each global variable is embedded directly into each package at design time. However, to manage the day-to-day operation of the data processing system, DBAs should be able to modify the values of the appropriate global variables in every package dynamically at run time. For example, a DBA may want to use one global variable configuration to load data from Inventory and another global variable configuration to load data from Sales.

SQL Server tables should be used to store non-default values for selected global variables. For example, a global variable configuration table stores configuration IDs, including a value for default configuration. Values that the DBA chooses to override can be associated with the default configuration or with a defined configuration. A global variable override table contains a row for each override value. Each row contains the override value, the name of the package to which the override applies, and a configuration ID for the override value. If the default configuration ID is specified for an override value, the override value for the specified package is used each time the default configuration of the package is executed. If a non-default configuration ID is specified, the override value for the specified package is used whenever the package is executed with the configuration ID. This enables DBAs to create configurations for specific purposes. For example, a DBA may want certain packages to be bypassed when Inventory data is loaded and other packages to be bypassed when sales data is loaded. In addition, the DBA may want the Inventory data to be loaded with different execution parameters, such as batch size or error threshold, than the sales data.

Because child packages in the data processing system are designed to inherit selected global variable values from parent packages, changes to the default values in a parent package flow to its child packages. Therefore, changes to default values need only be made in parent packages, unless a DBA wants to use different values in a child package.

The Data Driven Query task performs parameterized Transact-SQL operations on rows of data as they are imported into a SQL table from a source row set. The rows of data are held in an in-memory structure defined by a binding table, which must be a physical table that maps to the source row set. For each row in a source row set, the Data Driven Query task selects, customizes, and executes one of several Transact-SQL statements. The Transact-SQL statement is executed on each row is based on an evaluation of the row by an ActiveX transformation script within the Data Driven Query task. Evaluating each row in a table is resource intensive and can seriously degrade package performance. The parser in the Data Driven Query task does not support the use of conditional logic and parameterized, multi-table joins to generate the source row set, which would enable SQL Server to use set-oriented processing and improve the performance of the Data Drive Query task. Instead, the parser expects the source row set to be generated from an existing SQL Server table using simple logic.

To avoid the limitations, a stored procedure to generate the source row set for each Data Driven Query task can be used. These stored procedures are parameterized, contain conditional logic, and perform surrogate key lookups using multi-table joins. The use of stored procedures to generate the source row set in the Data Driven Query tasks provides a number of benefits, including: the parser in DTS Designer can successfully parse the stored procedure; conditional logic and surrogate key lookups using multi-table joins are performed based on parameters passed to the stored procedure from the Data Driven Query task; set-oriented processing enables the Data Driven Query task to be used as a fast in-memory forward cursor to step through the generated row set and perform selected Transact-SQL operations based on the ActiveX evaluation of each row in the row set; and each stored procedure is used in multiple Data Driven Query tasks, providing a single place to modify or extend the logic used to generate the row set for each Data Driven Query task.

Because the row set generated by the stored procedure does not map to an existing table, a physical table can be generated that contains the schema for the row set that the stored procedures generates. This physical table is defined as the binding table for the Data Driven Query task; and it does not contain data. In a Data Driven Query task, an ActiveX transformation script can be used to determine the Transact-SQL operation that is performed on each row, such as an insert or an update. However, the actual operation is performed by an insert or update stored procedure, using the parameterized values passed in by the Data Driven Query task. When the Data Driven Query task is used in the manner, it can be very fast. The logic can be easily extended trough the stored procedure without requiring any package to be edited.

A parent (or master) package can call and execute a child package through the Execute Package task. This capability allows a complex package workflow to be divided into two or more child packages that are called by a parent package. Using multiple packages increases package readability, enable discrete units of work to be encapsulated into individual packages, enables packages to be reused, and simplifies package debugging.

The Execute Package task communicates with a child package using inner and outer package global variables. Inner package global variables are used to set the values specified in the calling Execute Package task to global variables in the child package. The specified values override the default values for these global variables in the child package. Outer package global variables are used to pass the parent package global variables specified in the calling Execute Package task to the child package being executed. If these global variables do not exist in the child package, they are created temporarily. If these global variables exist, the parent package global variables and their values are used instead of identically named global variables in the child package.

A child package can communicate with the parent package or another child package that is also executed by the parent package by configuring each package with two global variables that store pointers: one global variable stores a pointer to the package's own global collection, while the other global variable stores a pointer to the global variable collection of its parent (or calling) package. Through these pointers, child package can communicate with parent packages and other child packages. Although this solution can not be used with the Execute Process task because the Execute Process task spawns its own process. A child package can update only the values in the global variable collection of the parent package if it is running in the same process as the parent package.

DTS provides precedence constraints to control workflow between tasks in a package based on the completion, success, or failure of a previous task. However, DTS does not provide a mechanism to control workflow within a package based on the value of a global variable. For example, it is quite useful to be able to have a package workflow proceed down either branch A or branch B of the package based on run-time conditions communicated to the package through a global variable value.

The ActiveX task can be used to solve this problem. Based on the value of a global variable, the ActiveX task uses conditional logic at run time to direct the workflow out of the ActiveX task to one of several branches in the package. Because the name of each task that the ActiveX task can activate is embedded in the ActiveX task itself, to extend the package, there may be a need to edit the ActiveX task itself instead of inserting a new task at the appropriate point in the package. In addition, this solution makes the workflow in the package more difficult to understand unless the actual ActiveX script in the task that performs the branching is viewed, because the ActiveX task appears to have multiple success paths when viewing the package through DTS Designer.

Looking back at FIG. 2, Business Application(s) 152 is in communication with Published Data 146. In one embodiment, Business Application(s) 152 can include one or more software applications. In some embodiments, Business Application(s) 152 includes an Enterprise Application Integration (EAI) Framework and/or a Business Intelligence Framework.

Figure 9:
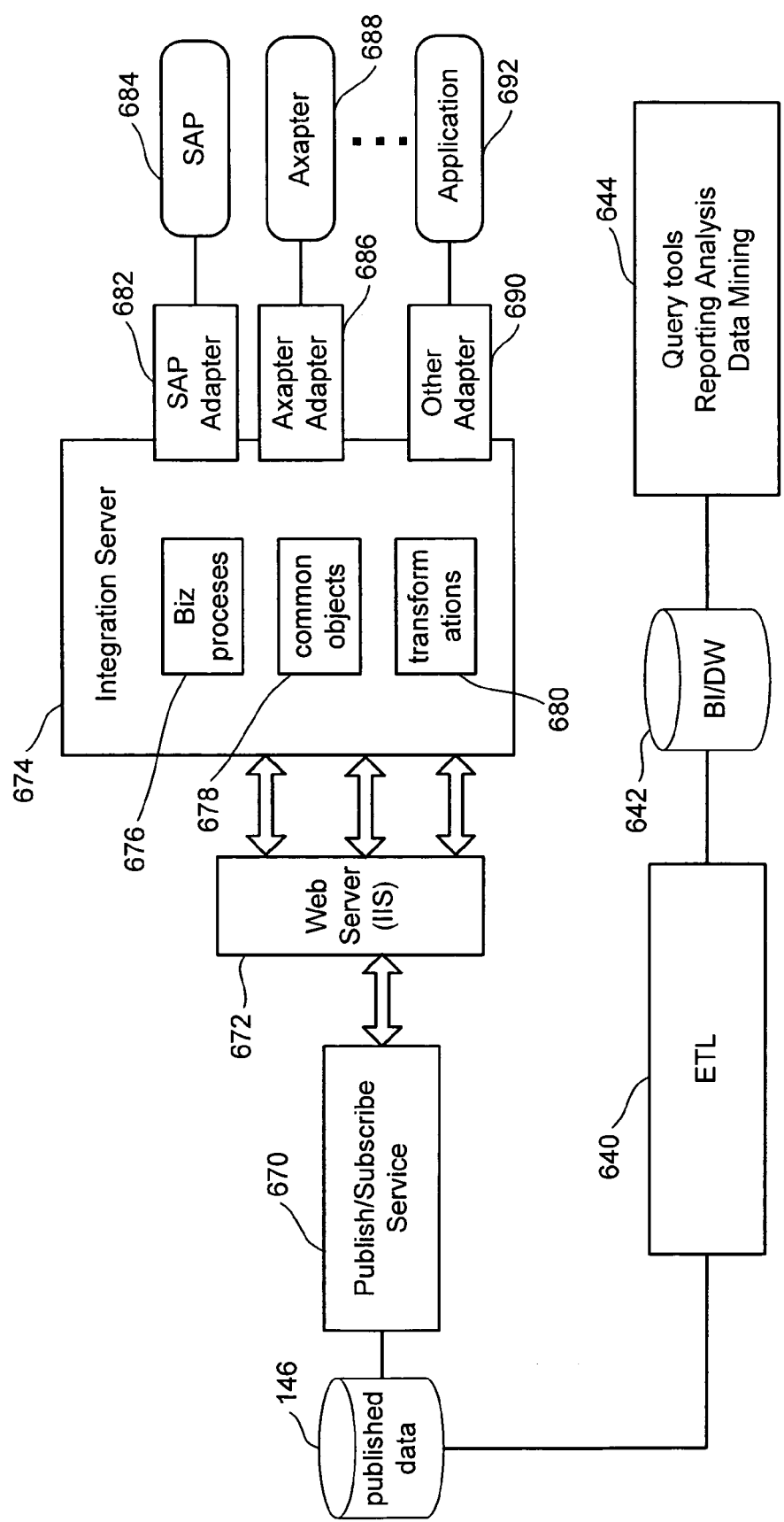
FIG. 9 is a block diagram depicting one embodiment of an architecture for application integration and for a business intelligence framework.

FIG. 9 depicts an Enterprise Application Integration (EAI) Framework and a Business Intelligence Framework. The EAI Framework includes Publish/Subscribe service 670 accessing data from Published Data 146 and providing that data to subscribers via web server 672. The ultimate subscribers are the business applications (e.g., SAP 684, Axapter, 688, and others 692). Integration Server 674 communicates with web server 672 to provide the data to the applications (684, 688, and 692) via adapters (682, 686 and 690). SAP adapter 682 is used to communicate with SAP application 684. Axapter Adapter 686 is used to communicate with Axapter application 688. Other custom adapter 690 is used to communicate with other application 692. In one embodiment, Integration Server 674 is a BizTalk Server from Microsoft Corporation and includes business processes 676, common objects 678 and transformations 680, RFID based Auto-ID systems can provide frequent, and unique item level information at all points in the supply chain. However, in order to do so, these systems should be tightly linked to existing Business Information Systems. EAI is the discipline of integrating applications and data within the enterprise into automated business processes.

There are four categories (EAI Services, Transport Services, Security Services, and Management Services) of logical services for EAI. Each will be discussed below.

EAI services require transport services in order to implement enterprise application integration, but applications can be integrated without EAI services. For example, if several applications all utilize (and can therefore communicate in) a consistent data format and interconnected by a message-queuing technology such as MSMQ or IBM MQSeries, that data can be shared without EAI services. However, in most EAI implementation scenarios, message delivery is just one of many services, and therefore the EAI solution relies upon the transport services for the ultimate delivery of messages to and from the respective applications. Traditionally, transport technologies alone were commonly used to integrate applications, but more is required to truly deliver on the benefits that EAI solutions can offer. To do so, organizations require solutions that make integration easier, cheaper, more flexible, and easier to manage. The provision of EAI services aims to meet these requirements by providing common, reusable services for accomplishing application integration tasks.

By dividing the model in this manner, the EAI services can process and manipulate the messages/data/processes/etc., and the transport services can deliver the messages/data/processes/etc. to the EAI services and dispatch the responses. Thus the transport services can be considered as providing the transport mechanisms for the messages and data flowing to and from the EAI services. The transport services also provide the "glue" to allow the interconnection of the different applications and business processes in the enterprise.

In this model, security and management services apply to all aspects of the infrastructure. Often security technologies are driven from the business rather than from the EAI technology. This model assumes the position that the EAI services live within a larger security model for the enterprise.

EAI services are divided into three main groups: Integration (Resolving semantics and data formats among applications); Orchestration (Integrating applications at the process level); and Metadata (Storing and managing the data that the EAI service requires).

The services for integration focus on the process of resolving the differing semantics and data formats of different applications. Each service performs different tasks that may be required to integrate one application with another. Not all services will be invoked for every interface that is established between every application. The services that are used will depend on the differences between the applications established across an interface.

All of these services assume that data has been passed from at least one application, known in this pattern as the source application, and is destined for at least one application, the target application, although the target may not be explicitly known. This does not mean that the services are limited to data integration, merely that data is the basic currency used by any EAI tool to integrate applications. Integration services are as follows: Parse (Takes a stream of input data from the network and creates structured data from it; Map (After structured data has been validated, the Map service tries to map it to the output data); Filter (Provides a mechanism for users to filter out information from certain data); Validate (Can be used to validate many elements of the data, such as syntax, format, and range); Transform (Uses the rules specified in the map of each data element to transform the contents of each element of input data to the corresponding element of output data); Format (Moves the content of input data elements to the corresponding elements of output data as specified in the map); Compose/Decompose (The Compose service composes new data from elements of other input data, using information from the Map service. The Decompose service decomposes input data into the appropriate output data); Enrich (Allows the business owner to specify from where the EAI tool should acquire information to add to the input data to create the required output data); Route (Allows the EAI service to represent a route to facilitate integration); and Publish (Collects information from applications and publishes it).

The integration services focus predominantly on resolving the heterogeneity of applications at a data level. Orchestration services, on the other hand, address the requirements of integrating applications at the process level. They are concerned with factors such as time, order, correlation, integrity, and events, as well as long-running transactions. Orchestration services are as follows: Schedule (Examines queues for data its processing needs to be scheduled for specific times, and adjusts queue processing as appropriate); Transaction Integrity (Manages resources so that units of work are processed in an ACID (atomicity, consistency, isolation, durability) fashion); Process Flow (Executes and manages a defined sequence of events); Non-delivery (Manages data when the data cannot be routed to a target); and Integration Events (Monitors integration events and invokes the correct process for handling them).

A significant amount of metadata must be stored and managed to support an EAI service. Most EAI tools hold this data internally, often within proprietary data stores. However, businesses often require access to this metadata for purposes such as replication to other instances of an EAI service, programmable access by other services, backing up and restoring for resilience, sharing metadata with other businesses, data mining and reuse, and change management. Metadata services therefore store and manage all the data required to support an EAI service. The metadata services are as follows: Data Models (Define the structure, syntax, and owners of data that is received from source applications and sent to target applications or published); Names (Supports an interface for defining names and identifying the entities that they reference); Discovery (Accesses Web services that the data manipulation services require); Configurations (Persists configurations of services so that they can be accessed programmatically or replicated for other systems or cloned systems); Repository (Provides a direct look-up service for specific resources that the EAI tool requires); User Profiles (Defines user characteristics); Interface Profiles (Defines the characteristics of the interfaces that the EAI service needs to support); Subscriptions (Holds the details of subscriptions that users and interfaces have to publications); Message Database (Holds messages that need to be accessed by other data services); Message Database Index (Holds indexing information about messages in the message database); and Message Database Search and Query (Allows searching for messages and querying data in the message database).

The Transport Services is often referred to as the "glue" that connects two or more applications together. The applications can be network applications, operating systems, file management systems, database management systems, transaction processing management systems, or business applications. The main goal of transport services is to simplify the connection of programs. These services should insulate the task of connecting programs from the complexity of the underlying operating system and communications network. Interfacing supports synchronous or asynchronous inter-application communication. The transport services that support interfacing are as follows: Dispatch (Manages the dispatch of procedure or method calls); Delivery (Uses the protocol of the network to send and receive data); Message Queue (Manages and orders the persistence of messages); Serialize/Deserialize (The Serialize service takes the output data structure and serializes it into a flat file that can be transmitted across a network. The Deserialize service does the reverse); Address Translate (Translates between the logical business address assigned to the destination of an integration service and the network address required by the network protocol); and Decode/Encode (The Decode service converts data to the same code page as the platform on which the EAI tool is running. If the EAI tool knows the code page of the target system, the Encode service can encode the character set of the output data into the code page of that system).

The security services provided are: Authenticate (Validates the identity of the user or interface that wants to access the service); Authorize (Manages what the user or interface is allowed to do); Encrypt/Decrypt (The Encrypt service encrypts the output data for security reasons before it is transmitted across a network. When the EAI service receives encrypted data, the Decrypt service is invoked to decrypt the data for processing.); Manage Certificates (Manages digital certificates that are used to establish the credentials of a user, interface, or application); Sign (Handles digital signatures that can be used to authenticate the sender or requester of a message or service); and Audit (Tracks activity within the EAI systems. The Audit service is focused specifically on events that are detected by the Authenticate and Authorize services).

The management services provided are: State Management (Manages the integrity of the status of processes); Resource Management (Enlists resources for the transaction manager); Event Monitor (Monitors all system events except integration events); Error Raising (Detects abnormal events and raises them as error events); Error Handling (Processes an event that the Error Raising service has raised as an error); Notify (Electronically informs a business user of a particular event in the EAI tool service through a standard communication channel); Configuration Management/Versions (Tracks configuration changes to an EAI component or modifications of EAI metadata, and maintains old versions); Load Balance (Distributes work across multiple physical systems); Track (Provides a way to analyze the log created by the Audit service to provide a trace of a complex series of related data); Monitor (Monitors all processes in the EAI tool and tracks the service levels of the processes dynamically); Archive (Periodically archives data from the metadata services); Report (Provides reports to both business users and system administrators); System Management (Provides health monitoring and deployment facilities); Audit (Records EAI system and service events, both normal and abnormal); and Recovery (For a process that fails, this service recovers the state of the process to a previously known status that preserves data integrity).

One product known to those skilled in the art that provides good coverage of the services discussed above is BizTalk® Server from Microsoft Corporation. BizTalk Server is complemented by the following products and technologies that can be used in conjunction with BizTalk Server to fulfill additional logical services: Microsoft Host Integration Server; Microsoft SQL Server; Windows core services including XML Web services, Microsoft Data Access Components (MDAC) data connectivity services, and COM+ application services.

BizTalk Server is an application integration server designed to support complex, distributed business processes. In particular, BizTalk Server offers a core messaging engine providing an integration framework together with "orchestration"—the ability to graphically depict a business process in flow-chart like manner, and link this to executable components.

Host Integration Server is a comprehensive set of transactional gateways, services, and connectors that facilitate integration between the Microsoft Windows® platform and host environments such as CICS, IMS, AS/400, and UNIX. It includes advanced features such as password mapping, XA transaction support, CICS application access, and virtual private networking (VPN) for Internet-based applications.

Microsoft SQL Server is a powerful relational database that also offers a number of data integration features through the ability to replicate databases, transform and import data by using Data Transformation Services, and execute queries across heterogeneous data sources.

XML Web services are a building block in the move to distributed computing on the Internet. Open standards and the focus on communication and collaboration among people and applications have created an environment where XML Web services are becoming the platform for application integration. Applications can be constructed by using multiple XML Web services from various sources that work together regardless of where they reside or how they were implemented. XML Web services are successful for two reasons: First, they are based on open standards, making them interoperable, and second, the technology used to implement them is ubiquitous.

Microsoft Data Access Components include Microsoft ActiveX® Data Objects (ADO), OLE DB, and Open Database Connectivity (ODBC). COM+ services provide transaction and security boundaries around business logic components that can be used to manipulate data as it flows through an EAI process.

Four variations of EAI solution implementations are explained below. In each of these four variations BizTalk Server can be a core component of the overall solution. First, a classic hub-and-spoke messaging integration solution is available. This addresses EAI integration at the application layer. This solution is characterized as a central logical hub that provides data transformation, routing, receipt, and delivery services, among other complementary functions, to address the common challenges of heterogeneous application integration. In this approach, various distributed applications communicate with the hub through messages, and the hub performs all intelligent processing and state management of those processes.

Second, a hub-and-intelligent-spoke, distributed messaging integration solution can be used. This also addresses application integration. As in the preceding solution, this solution is characterized as one where a central hub provides data transformation, routing, receipt, and delivery services as well as other complementary functions, but in this variation distributed nodes exist that also possess these capabilities. The result is a centralized primary hub, with distributed processing nodes that can perform application integration locally as well as communicate in a structured and automated way with the central hub.

Third, a business process orchestration solution can be implemented. This addresses process integration in addition to application integration. In this variation, orchestration services are used to perform higher-level business process automation functions, leveraging the services of the environment to handle challenges of state management, transaction management, error and exception handling, concurrency, and other rule-based considerations of business processes. Leveraging these more sophisticated "state engine" services as part of defined and deployed processes may or may not utilize core data transformation and routing services also present in the platform, though in practice, those services are utilized.

Fourth, a web services solution can be used. This addresses application or process integration with the ability to expose the service outside of the normal trusted domain within which EAI has traditionally operated. Web Services solutions are normally characterized by utilizing standards-based messaging technologies to expose an existing (often legacy) application as a Web service, as well as combining Web service interactions (and often non-Web service interactions) into higher-level business processes.

Universal Application Network ("UAN"), launched by Siebel Systems, is a next-generation solution that meets the application integration requirements mentioned in the section above. It provides a rich library of pre-packaged, industry-specific business processes, which span multiple applications within and across the enterprise. UAN business processes are architected to be application independent, thus enabling organizations to leverage their existing investment. While it is possible to meet all of the application integration requirements by leveraging the platform components listed above, UAN is an example of a prepackaged solution that successfully leverages the platform components and can allow designers to deploy in a more timely and reliable manner. UAN solves the semantic problem through the use of common objects and pre-built transformations to popular applications. It is built upon open industry standards—XML and Web services—enabling enterprises to avoid vendor "lock in" and ensuring interoperability with other solutions.

At the high level, the UAN solution consists of three primary components, which are supported by BizTalk Server: Business Process Library (A library of prepackaged, industry specific business processes based on best practices. These pre-built, quality-assured business processes can be executed across multiple applications, departments, organizations, and enterprises); Business Process Design Tool (Integration scenarios are best facilitated with a graphical tool for developing and configuring business process solutions. BizTalk Orchestration Designer is used to model and configure existing business processes and create new ones); and an Integration Server (The integration server must coordinate communication between and among applications. BizTalk Server is used to execute business processes and coordinate inter-application communication).

Pipelines are used to create the base processing required to interface with specific source and target systems. Document parsing/serializing, transport specification, security authorization/identification, encryption/decryption, and custom pre-/post processing are handled in the pipeline processing. This capability enables endpoints to be abstracted for the business process model and aligns with the common services interface concept in the Universal Application network architecture.

BizTalk Server provides an advanced adapter framework that allows for custom and packaged system interfaces to be integrated into the BizTalk Server environment. Using XML Web Services as the standard interface mechanism—and adding common configuration metadata, user interface component and management interfaces-adapter interfaces—adapters to complex proprietary systems appear as native BizTalk Server XML Web Service interface.

The BizTalk Server execution engine provides complete manageability, control, auditing, and post-process analysis. The BizTalk Server management console provides administrative and control capabilities. In addition, full integration with Microsoft Operations Manager allows for effective administration in a managed IT environment, including alerts, monitoring dashboard capabilities, and SNMP message generation.

The BizTalk Server execution engine allows for clustering to "scale out" and "scale up." In addition, processing components can be spread across servers to optimize the workload and ensure maximum throughput. By creating a virtual processing hub, users receive all the benefits of a central management system and the scalability of a distributed architecture. BizTalk Server uses standards based security—such as PKI, SSL, and S/MIME—for securing data with a "configure not code" approach.

The combination of the deep customer business process knowledge captured in Universal Application Network with the technical capabilities of BizTalk Server provides enterprises with the capabilities needed to leverage legacy technology assets and new system implementations that leverage RFID information without being locked into functional silos. BizTalk Server provides a unified tool for design through the deployment of end-to-end, industry-specific business processes while reducing the cost, complexity, and time of cross-application integration.

Looking back at FIG. 9, a Business Intelligence Framework is also depicted that includes a Extraction, Transformation and Loading Service 640 for extracting data from Published Data 14:, transforming that data into a format suitable for data warehousing; and loading the data into Business Intelligence Data Warehouse 642. Query/Data Mining/Reporting Analysis tools 644 access the data in Business Intelligence Data Warehouse 642 to allow intelligent use of the data.

The role of the system is to extract the data from Published Data 146, cleanse and harmonize it, and then incorporate it into a central repository. In one embodiment, the data in the data warehouse is read-only from the user's perspective. It is intended for decision support purposes, which includes creating standard and parameterized reports, ad-hoc reports, data analysis and data mining.

Data associated with the RFID tags represent location and telemetry related information, and product-related/process-related information. Location and telemetry related information are related to inventory related data in business information systems. As in most systems, inventory files contains location information, quantity and date information. For example, the data can include inventory related data (either finished goods or raw materials) such as Inventory_location_id; part_id; part_quantity; part_arrival_time; and purchase_order_number. WIP related data can also be collected, such as Shop_order_id; operation; resource; current_location; unfinished_part_id; unfinished_quantity; finished_part_id; finished_quantity; finish_location; completion_time; completion_flag. Product-related information and process-related information are related to the bill of material, routing/operation related data, resource data, part/product data, etc.). For example, there is Bill of material related data (produced_part_id, produced_quantity, routing; operation, consumed_part_id, consumed_quantity); Routing related data (Routing_id, operation, run_time, runtime_unit_of_measure); Product/Part related data (Part_id, description, unit_prices, price_unit_of_measure); and Resource tracking data (Resource_id, resource_type, status, location, description, total_down_time, in_production_time).

In one embodiment, the system uses real-time Online Analytical Processing ("OLAP"), which may include the use of either a real-time dimension or a real-time cube. A real-time dimension is a shared regular OLAP dimension that supports real-time updates. The requirements for creating a real-time dimension are similar to those for creating a shared changing dimension, in that member keys must be unique for the members of the lowest level of the dimension. In addition, aggregation usage is limited to the list of available values provided for shared changing dimensions.

A real-time cube is a cube in which one or more OLAP partitions or dimensions support real-time updates. Multiple dimensions or partitions can support real-time updates, and a real-time cube can have a mixture of dimensions or partitions that may or may not be enabled for real-time updates. Because of the complexity involved in managing such real-time cube data, the requirements for creating a real-time cube are more stringent than for a regular cube. Remote partitions, which are used in distributed partitioned cubes, cannot be enabled for real-time updates.

To support real-time updates, an OLAP partition must either store no aggregations, or it must use indexed views to generate and store aggregations. Using a real-time partition with no aggregations allows you to support real-time updates without requiring structural changes to a SQL Server 2000 database, but at a cost in performance. Indexed views provide a clear performance increase for most OLAP partitions, but have some fairly stringent requirements that must be satisfied, and require the capability to make structural changes to the SQL Server 2000 database.

When an object that supports real-time updates is created, Analysis Services uses the trace mechanism in SQL Server 2000, along with a proprietary trace event class, to create a notification event for database tables that are used by the object. For a real-time dimension, the notification event is created for all of the tables that are used by the dimension. For a real-time cube, however, the notification event is created only for the fact tables that are used by partitions that support real-time updates for the cube. (The indexed views used by partitions in real-time cubes are used only for retrieval and aggregation purposes.) A listener thread, running on Analysis Services, subscribes to and receives these notification events.

The notification event is raised on a per-transaction, not per-operation, basis. For example, a single transaction can contain thousands of SQL UPDATE operations to a large fact table, but only one notification event is raised when the transaction is committed. If notification events are enabled for a given table during a database transaction (for example, when a real-time dimension is created on a dimension table receiving a periodic update), the transaction may not raise a notification event. However, this is an extremely rare occurrence, and you can prevent it by enabling real-time updates during periods of low relational database activity.

The per-transaction approach for the notification mechanism is important because you can potentially improve real-time performance by batching multiple SQL INSERT, UPDATE and DELETE operations into a single transaction whenever possible. Every time a notification event is received, objects in the server cache are invalidated. The effect of this invalidation becomes important when the server cache and client cache attempt to synchronize.

When the Analysis Services listener thread receives a notification event for a database table, the thread instructs the Analysis server to invalidate the server cache for any real-time object that depends on the database table. Invalidation requires the Analysis server to update the metadata for the real-time object the next time it receives a request from a client application for data or metadata for that object. If a request for data is received, the data for the object is loaded on demand only after the metadata for the object has been retrieved and organized.

Real-time OLAP depends in part on the efficiency and speed with which requests are processed. Requests for data and metadata trigger updates on the server cache and guide the server cache as to the depth and width of data to be cached. However, queries and requests are not synonymous—a request is not necessarily a query. In Analysis Services, the term "query" refers to a Multidimensional Expressions (MDX) statement issued by a client application. PivotTable® Service from Microsoft Corporation, the OLE DB provider used to access Analysis Services, breaks down an MDX statement into one or more separate requests for data or metadata. If PivotTable Service can satisfy a request through the client cache, the request is not sent to the Analysis server. If all of the requests for a query can be satisfied in the same manner, no communication with the Analysis server is required. However, PivotTable Service can send requests for other reasons. Requests can be sent in response to drill-up or drilldown requests made by a client application, or through the synchronization mechanism used by PivotTable Service. As such, communication between PivotTable Service and the Analysis server can be somewhat difficult to predict or control.

Real-time dimensions are shared regular OLAP dimensions that are enabled for real-time updates. OLAP dimensions are handled differently from other dimensions in Analysis Services. MOLAP dimension members and member properties are fully cached when the MSSQLServerOLAPService service is started, but OLAP dimensions are cached on demand from the relational database in a two-step process. Starting at the top level of the ROLAP dimension, a number of members are retrieved to fill in the structure; the number is equivalent to the large level threshold for the Analysis server. Dimension sub trees are constructed on demand as requests for data or metadata are received.

Processing for real-time dimensions is also different than it is for other regular OLAP dimensions. A regular OLAP dimension is considered to be a changing dimension by Analysis Services. Unlike other dimensions, rebuilding the structure of a changing dimension is necessary only if the following changes are made: add, move, rename, or delete either the top or bottom level; or add, move, rename, or delete a level that contains member groups. Otherwise, a changing dimension can be incrementally updated. The benefit of an incremental update is that it does not require dependent objects such as cubes to be reprocessed. Real-time dimensions function similarly, in that if you do not change the structure of a real-time dimension, it does not require rebuilding. However, because a real-time dimension is cached on request, an incremental update isn't necessary. The cache for the real-time dimension is invalidated and re-cached on demand as requests for data and metadata are received. If the structure of a real-time dimension is altered in the ways mentioned earlier, the real-time dimension must be rebuilt.

Real-time dimensions tend to be more performance intensive; because multiple cubes can depend on a real-time dimension, their cached results can become invalidated when the underlying dimension table changes. An update to a dimension table for a real-time dimension can have a much larger effect on the server cache than an equivalent update to a fact table for a real-time cube. As such, real-time dimensions are more "expensive" in terms of resources and performance, and should therefore be used sparingly.

To the Analysis server, real-time cubes can have one or two levels of caching. If a real-time cube does not use real-time dimensions, the Analysis server retrieves and aggregates data for the real-time cube on demand, and caches the results (both data and metadata) in the query results cache. If a real-time cube uses a real-time dimension, the necessary sub trees for the real-time dimension must first be cached to provide structural information for the real-time cube. The real-time cube then retrieves data from the relational database and aggregates it within the newly cached structure.

Real-time cubes can be somewhat less performance intensive than real-time dimensions, because dimension data does not typically require reconstruction when an update is made to a fact table. If a cube uses a real-time dimension, and the real-time dimension is invalidated, the relevant dimension sub trees cached for the cube are also invalidated and must be reloaded and reconstructed before the cube can satisfy a request for data.

PivotTable Service uses a synchronization technique involving version information to determine which objects require reloading in its client cache. Synchronization occurs either when PivotTable Service issues a request for data or metadata to the Analysis server, or when auto synchronization is triggered. Management of this synchronization process becomes important when a real-time object is invalidated in the server cache.

As discussed earlier, MDX queries are not synonymous with requests for data or metadata. On each request for data or metadata, PivotTable Service validates the version information in the client cache for the object or objects referenced in the request against the version information in the server cache. If the versions in the client cache and server cache match, no request for data is made and PivotTable Service supplies the necessary information directly from the client cache. If the versions do not match, however, the referenced objects in the client cache are invalidated.

PivotTable Service also attempts to synchronize the client cache at regular intervals, even if an MDX query has not been issued. At an interval determined by the Auto Synch Period connection string property, the background thread used by PivotTable Service validates all of the objects in the client cache against the corresponding objects in the server cache. If the version information does not match for a specific object, or if the server cache has been invalidated for a specific object, that object is invalidated in the client cache.

One difference between the server cache and the client cache is that, to PivotTable Service, only cubes are cached. If a real-time dimension is invalidated in the server cache, the dimension sub trees used by cubes that depend on that real-time dimension are invalidated in the client cache. If a real-time cube is invalidated in the server cache, only the data and metadata for the real-time cube is invalidated in the client cache.

When an object is invalidated in the client cache, PivotTable Service flushes the data for that object and attempts to reconstruct the object metadata with the server cache. Note that at this point, PivotTable Service does not reconstruct the data; it waits for a request for data before attempting to repopulate the object, and then only to satisfy the request for data.

The metadata for the dimension or cube is invalidated, even if a change is made to just a single record in the relational database. With the object invalidated, any queries executed against it require the Analysis server to re-query the relational database and rebuild the data and metadata for the object in the server cache. During that time, PivotTable Service may send additional requests for data or metadata. The way in which these additional requests are resolved depends on the object being referenced. If a request for data or metadata is issued for a real-time dimension, the request is completed as the information becomes available. If a request for data is issued for a real-time cube, the state of the information influences the success of the request. If the request is executed at the time any of the objects it referenced became invalidated, the request is re-executed. If the request was open at the time any of the objects it referenced became invalidated, it falls out of context and any attempt to reference the data managed by the out-of-context request fails.

Real-time OLAP is an effective way to provide access to low-latency aggregated data like RFID related data. The performance and expectations of real-time OLAP can vary based on a number of factors, including networking, database and Analysis server usage, and the design of the cubes and dimensions. The benefits of real-time OLAP become evident, however, when these factors are accounted for and mitigated through design and performance tuning.

Figure 10:
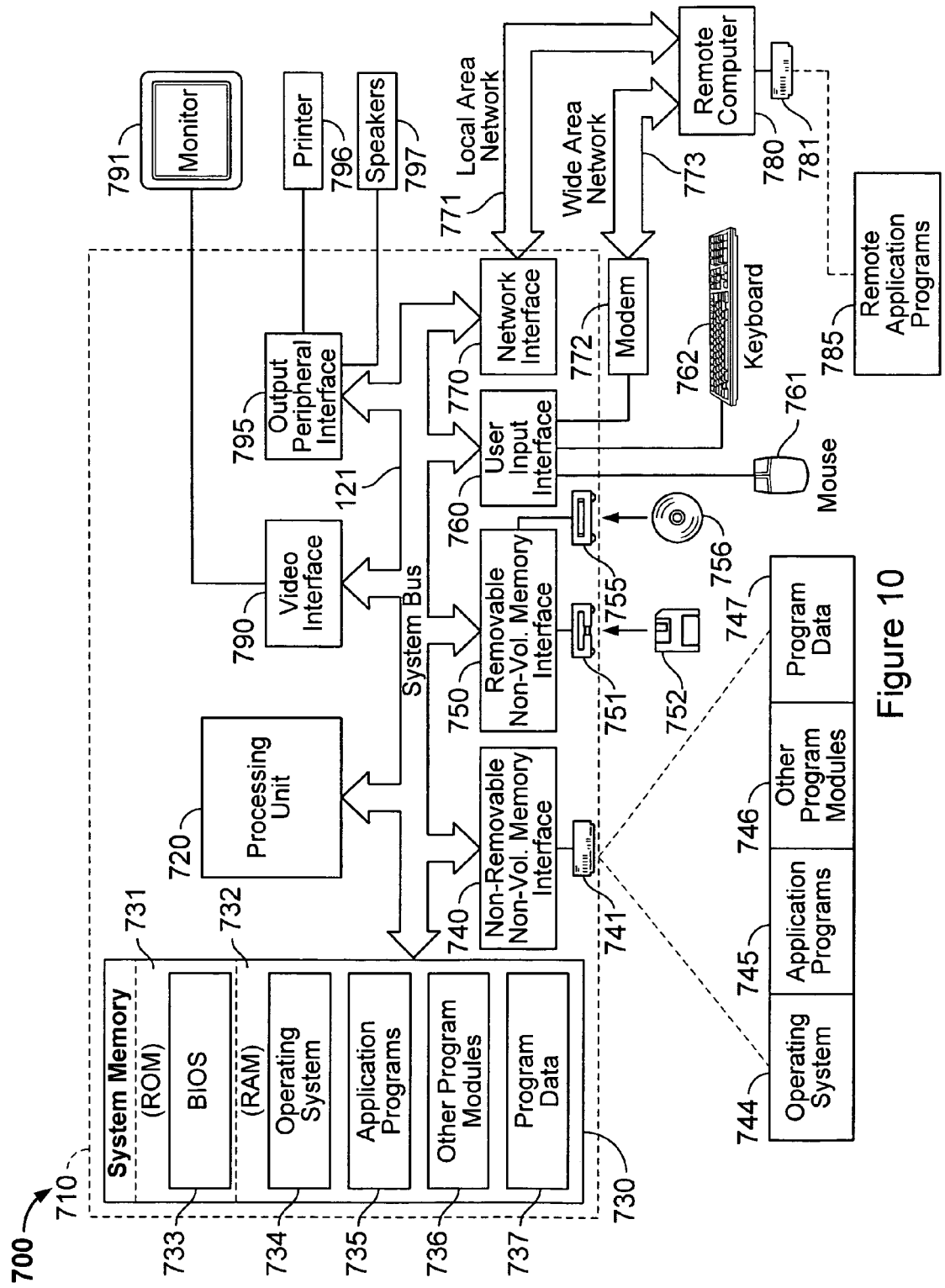
FIG. 10 is a block diagram of one example of a computing system.

FIG. 10 illustrates an example of a suitable general computing environment 700 that may be used to implement many of the computing devices describe above. The computing system environment 700 is only one example of a suitable computing environment and is not intended to suggest any limitation as to the scope of use or functionality of the invention. Neither should the computing environment 700 be interpreted as having any dependency or requirement relating to any one or combination of components illustrated in the exemplary operating environment 700.

The invention is operational with numerous general purpose or special purpose computing system environments or configurations. Examples of well known computing systems, environments, and/or configurations that may be suitable for use with the invention include, but are not limited to, personal computers, server computers, hand-held devices, notebook or laptop devices, personal digital assistants, telephones (wired, wireless, or cellular), multiprocessor systems, microprocessor-based systems, set top boxes, programmable consumer electronics, network PCs, minicomputers, mainframe computers, other computing devices distributed computing environments that include any of the above systems or devices, and the like.

The invention (or a portion of the invention) may be described in the general context of computer-executable instructions, such as program modules, being executed by a computing device. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 10, an exemplary system for implementing the invention includes a general purpose computing device in the form of a computer 710. Components of computer 710 may include, but are not limited to, a processing unit 720 (which can include multiple processors), a system memory 730, and a system bus 721 that couples various system components including the system memory to the processing unit 720. The system bus 721 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 710 typically includes a variety of computer readable media. Computer readable media can be any available media that can be accessed by computer 710 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 710. Communication media typically embodies computer/processor readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 730 includes computer storage media in the form of volatile and/or nonvolatile memory such as read only memory (ROM) 731 and random access memory (RAM) 732. A basic input/output system 733 (BIOS), containing the basic routines that help to transfer information between elements within computer 710, such as during start-up, is typically stored in ROM 731. RAM 732 typically contains data and/or program modules that are immediately accessible to and/or presently being operated on by processing unit 720. By way of example, and not limitation, FIG. 10 illustrates operating system 734, application programs 735, other program modules 736, and program data 737.

The computer 710 may also include other removable/non-removable, volatile/nonvolatile computer storage media. By way of example only, FIG. 10 illustrates a hard disk drive 741 that reads from or writes to non-removable, nonvolatile magnetic media, a magnetic disk drive 751 that reads from or writes to a removable, nonvolatile magnetic disk 752, and an optical disk drive 755 that reads from or writes to a removable, nonvolatile optical disk 756 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 741 is typically connected to the system bus 721 through a non-removable memory interface such as interface 740, and magnetic disk drive 751 and optical disk drive 755 are typically connected to the system bus 721 by a removable memory interface, such as interface 750.

The drives and their associated computer storage media discussed above and illustrated in FIG. 10, provide storage of computer readable instructions, data structures, program modules and other data for the computer 710. In FIG. 10, for example, hard disk drive 741 is illustrated as storing operating system 744, application programs 745, other program modules 746, and program data 747. Note that these components can either be the same as or different from operating system 734, application programs 735, other program modules 736, and program data 737. Operating system 744, application programs 745, other program modules 746, and program data 747 are given different numbers here to illustrate that, at a minimum, they are different copies. A user may enter commands and information into the computer through input devices such as a keyboard 762 and pointing device 761, commonly referred to as a mouse, trackball or touch pad. Other input devices (not shown) may include a microphone, joystick, game pad, satellite dish, scanner, or the like. These and other input devices are often connected to the processing unit 720 through a user input interface 760 that is coupled to the system bus, but may be connected by other interface and bus structures, such as a parallel port, game port or a universal serial bus (USB). A monitor 791 or other type of display device is also connected to the system bus 721 via an interface, such as a video interface 790. In addition to the monitor, computers may also include other peripheral output devices such as speakers 797 and printer 796, which may be connected through a output peripheral interface 790.

The computer 710 may operate in a networked environment using logical connections to one or more remote computers, such as a remote computer 780. The remote computer 780 may be a personal computer, a server, a router, a network PC, a peer device or other common network node, and typically includes many or all of the elements described above relative to the computer 710, although only a memory storage device 781 has been illustrated in FIG. 10. The logical connections depicted in FIG. 10 include a local area network (LAN) 771 and a wide area network (WAN) 773, but may also include other networks. Such networking environments are commonplace in offices, enterprise-wide computer networks, intranets and the Internet.

When used in a LAN networking environment, computer 710 is connected to LAN 771 through a network interface or adapter 770. When used in a WAN networking environment, computer 710 typically includes a modem 772, network interface or other means for establishing communications over the WAN 773, such as the Internet. The modem 772, which may be internal or external, may be connected to the system bus 721 via the user input interface 760, or other appropriate mechanism. In a networked environment, program modules depicted relative to the computer 710, or portions thereof, may be stored in the remote memory storage device. By way of example, and not limitation, FIG. 10 illustrates remote application programs 785 as residing on memory device 781. It will be appreciated that the network connections shown are exemplary and other means of establishing a communications link between the computers may be used.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A method for managing process data, comprising:
    receiving status information at a handheld computing device, said status information includes Radio Frequency Identification (RFID) data and status data about one or more objects;
    synchronizing said handheld computing device with a controller, including synchronizing said status information;
    removing redundant data from said RFID data and said status data at said controller;
    sending said RFID data and said status data from said controller to a separate data processing system;
    receiving status information at said separate data processing center;
    storing said status information in a first format in a temporary data store, said storing is performed by said separate data processing system;
    adding attribute information for said one or more objects to said status information in said temporary data store, said adding attribute information comprises:
        accessing said RFID data in said temporary data store,
        using said accessed RFID data to determine if said attribute information is in a cache,
        acquiring said attribute information from said cache if said attribute information is in said cache,
        acquiring said attribute information from an external look-up service if said attribute information is not in said cache, and
        storing said attribute information in said first format in said temporary data store in association with said status information;

transforming said status data and attribute information to a second format based on metadata; and publishing said transformed status data and attribute information.

2. The method according to claim 1, further comprising:

receiving data for pre-populating forms at said handheld computing device, said data for pre-populating forms is received from said controller; and providing said forms to a user with said data for pre-populating said forms, said receiving status information at a handheld computing device includes receiving said status data about said one or more objects based on said forms.

3. The method according to claim 1, further comprising:

providing said transformed status data and attribute information to a server that includes a plurality of adapter processes, each adapter process is used to communicate with a different business process; and using said adapter processes to communicate said published and transformed status data and attribute information to said different business applications.

4. The method according to claim 1, wherein:

said publishing includes providing said transformed status data and attribute information to an extraction, transformation and load entity for delivery to a data warehouse; and providing said status data and attribute information to a data mining tool from said data warehouse.

5. A method for managanging process data, comprising:

receiving data for pre-populating forms at a handheld computing device, said data for pre-populating said forms is received from a controller;

receiving Radio Frequency Identification RFID data at said handheld computing device;

providing said forms to a user with said data for pre-populating said forms;

receiving status data about one or more objects based on said forms;

synchronizing said handheld computing device with said controller, including synchronizing said status data and said RFID data; and sending said RFID data and said status data from said controller to a separate data processing system;

receiving status information at said separate data processing system, said status information includes said RFID data and said status data about one or more objects;

storing said status information in a first format, said separate data processing system performs said receiving status information and storing said status information in said first format;

mapping said status data to attribute information about said one or more objects using said RFID data;

transforming said status data and attribute information to a first schema based on metadata;

providing said transformed status data and attribute information to a server that includes a plurality of adapter processes, each adapter process is used to communicate with a different business process; and using said adapter processes to communicate said transformed status data and attribute information to said different business applications.

6. A method for managing process data, comprising:

receiving status information at a handheld computing device, said status information includes Radio Frequency Identification (RFID) data and status data about one or more objects;

synchronizing said handheld computing device with a controller, including synchronizing said status information;

removing redundant data from said RFID data and said status data at said controller;

sending said status information, including said RFID data and said status data, from said controller to a separate data processing system;

receiving said status information at said separate data processing system;

storing said status information in a first format at said separate data processing system;

mapping said status data to attribute information about said one or more objects using said RFID data:

transforming said status data and attribute information to a first schema based on metadata;

providing said transformed status data and attribute information to a server that includes a plurality of adapter processes, each adapter process is used to communicate with a different business process; and using said adapter processes to communicate transformed status data and attribute information to said different business applications.

7. The method according to claim 6, further comprising:

adding attribute information for said one or more objects to said status information, said adding attribute information comprises:

using said RFID data to determine if said attribute information is in a cache, acquiring said attribute information from said cache if said attribute information is in said cache, acquiring said attribute information from an external look-up service if said attribute information is not in said cache, and storing said attribute information in said first format in said temporary data store in association with said status information.

* * * * *

UNITED STATES PATENT AND TRADEMARK OFFICE
CERTIFICATE OF CORRECTION

PATENT NO. : 7,497,370 B2
APPLICATION NO. : 11/094052
DATED : March 3, 2009
INVENTOR(S) : Lingzhi L. Allen et al.

Page 1 of 1

It is certified that error appears in the above-identified patent and that said Letters Patent is hereby corrected as shown below:

In column 25, line 29, in Claim 5, delete "managanging" and insert -- managing --, therefor.

Signed and Sealed this
Nineteenth Day of April, 2011

David J. Kappos
*Director of the United States Patent and Trademark Office*